May 13, 1924.
L. L. DUBOIS
COUPLING MEANS
1,493,970
Original Filed June 29, 1920
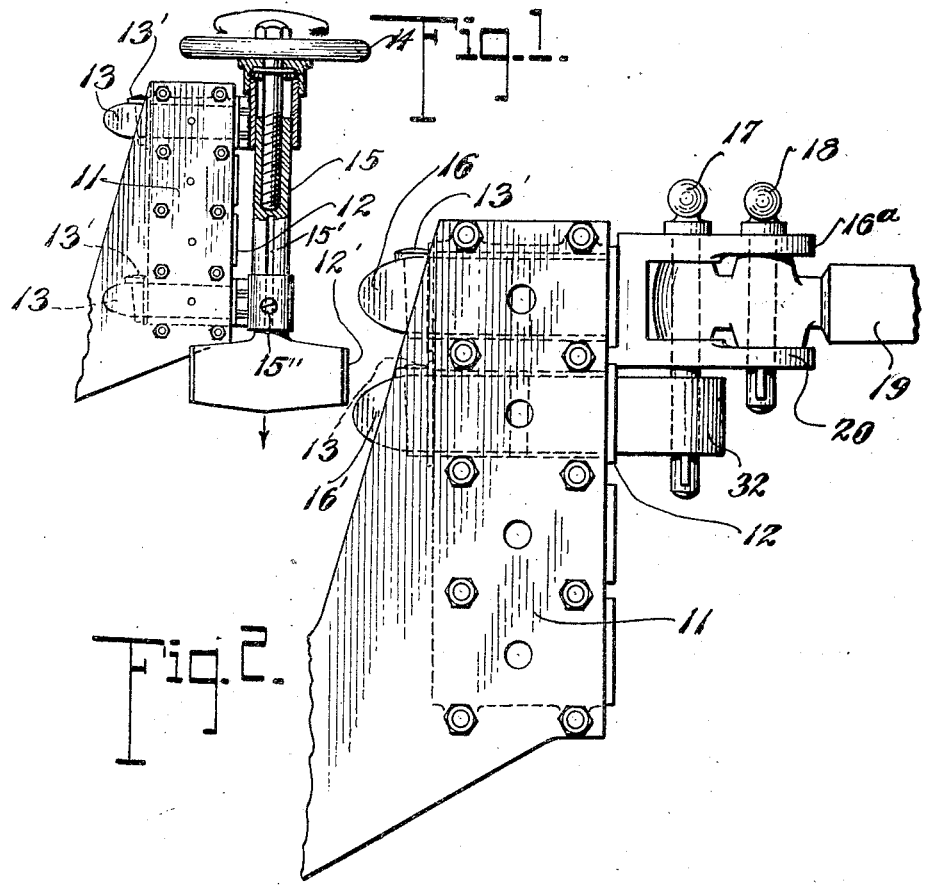
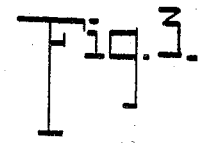
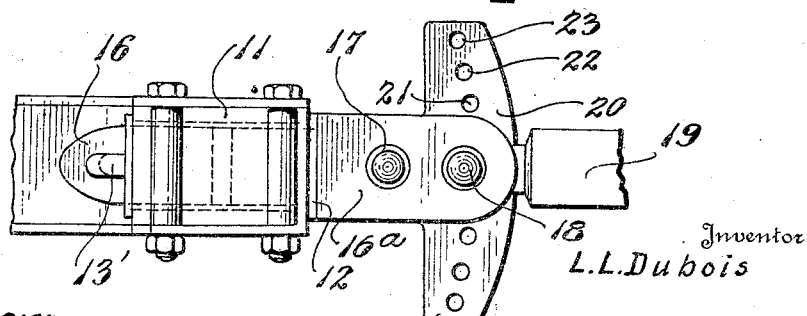
Witness: C.H. Wagner
Inventor
L. L. Dubois
By Lawrence Langner
Attorney Patented May 13, 1924.

1,493,970

UNITED STATES PATENT OFFICE.

LOUIS LUBIN DUBOIS, OF ASNIERES, FRANCE.

COUPLING MEANS.

Original application filed June 29, 1920, Serial No. 392,793. Divided and this application filed September 19, 1921. Serial No. 501,758.

*To all whom it may concern:*

Be it known that I, LOUIS LUBIN DUBOIS, citizen of the French Republic, residing at 29 Rue de l'Avenir, Asnieres, Seine, France, have invented a new and useful Improvement in Coupling Means; and I do hereby declare the following to be a full, clear, and exact description of the same.

The present invention relates to improvements in means for coupling machines and implements to tractors.

The object of the invention is to provide an improved coupling means with which may be obtained, on the one hand, an exact adjustment of the height of the coupled machine or implement and, on the other hand, any character of coupling for the said machine or implement from a coupling rigid in every direction to a coupling articulated for relative movement of the coupled devices in all directions.

The constructions disclosed are particularly applicable to tractors of the type illustrated in applicant's former copending application, Serial No. 392,793, filed June 29, 1920, Patent 1,398,683, of which this application is a division.

In the accompanying drawings, which illustrate, by way of example, some constructional forms of the invention:—

Fig. 1 illustrates a form of coupling device having provision for adjustment of the height of the coupled machine or implement.

Fig. 2 is a view in side elevation of a different form of coupling device; and

Fig. 3 is a plan view of the construction shown in Fig. 2.

Referring to the drawings the reference numeral 11 indicates the rear portion of a coupling cross-piece which, at its front end, may be rigidly attached to the axle of a tractor, as illustrated in applicant's patent above referred to. The coupling member 11 is provided with a vertical series of horizontal cylindrical openings 12.

In the construction shown in Fig. 1 a pair of coupling elements 13 have cylindrical portions engaged in the upper and lower cylindrical openings 12. These coupling elements are secured against displacement from the openings 12 by keys 13' inserted in their forward ends and they terminate at their rear extremities in sleeves in which is mounted a vertical rod 15 adjustable axially by means of a screw operated by a hand wheel 14 and terminating at its lower end in a horizontal socket 12' similar to the openings or sockets 12 and which receives the male element of the device to be coupled to the tractor.

It is apparent that a construction of this kind enables an agricultural implement to be attached to a tractor at different heights while providing for an adjustment of its height with sufficient precision.

This construction permits any kind of implement or machine to be coupled to the tractor, but, once coupled, the whole (tractor and machine or implement) forms an assembly which is rigid in a longitudinal direction.

The vertical rod 15 is shown at its highest point of elevation. It is prevented from turning in the sleeves of the coupling elements 13 by any appropriate means. For instance, a set-screw 15" could be provided in the sleeve of the lower coupling element to extend into the slot 15' in the rod 15.

The improved coupling device illustrated in Figs. 2 and 3 admits of the coupling of the machine or implement to the tractor with rapid and selective attainment of the following results:

1. A coupling rigid in all directions.
2. A coupling rigid in the vertical plane only such that the tractor and the implement can assume relative positions making an angle to each other in the horizontal plane only with or without turning of the male coupling element about its longitudinal axis.
3. A coupling by universal joint such that the turning or pivotal movements can take place in every direction.

The coupling device comprises the cross-piece 11 having the vertical series of horizontal, cylindrical openings 12 and a pair of coupling elements 16 and 16' having cylindrical portions engageable in any of the openings 12 and secured against displacement therefrom by the keys 13' inserted in their forward ends.

The coupling element 16 terminates rearwardly in a fork 16ª each limb of which is formed with two holes for the reception of the axle-pins 18 and 17. The gap between the limbs of the fork is, for a purpose indicated later, wider where the pin 17 traverses it than where the pin 18 traverses it.

The coupling element 16' is provided with a transverse opening for the reception of the pin 17; it can, if necessary, be extended and its extremity provided with a second opening for the reception of the pin 18.

The member 19 rigid with the implement to be coupled (for example, it may be the draught-bar of the implement) is so formed at its extremity as to be engageable in the fork 16ª. It has two thicknesses corresponding to the two widths of the gap between the limbs of the fork and it is provided with two openings corresponding to those of the fork so that the pins 17 and 18 can be passed through the fork 16ª, the member 19 and the part 16' as required.

The use or operation of the construction which has just been described is as follows:

1. If an absolutely rigid coupling is desired, the pins 17 and 18 are engaged in their respective openings in the members 16ª, 19 and 16'.

2. If it is desired to allow the tractor and coupled implement to make an angle with each other in the horizontal plane to facilitate turning, the pin 18 is removed. In this case there is a swinging or pivotal movement in the horizontal direction about the axis of the pin 17. The angular displacement can be limited between any two points by means of stops arranged upon a sector 20, either between the symmetrically arranged stops 21 and 21'; 22 and 22', 23 and 23', or between the unsymmetrically arranged stops 21' and 23 or 21 and 23', etc., according to the requirements of the work.

3. If it is desired that the implement, while being rigidly coupled to the tractor in the horizontal plane, may have a rotative movement with respect to the tractor about a longitudinal axis of the system, the coupling action of the member 16' is done away with by substituting for the pin 17 a shorter pin which does not reach the member 16'. The pin 18, of course, remains in engagement with the fork 16ª.

4. Finally, if it is desired that the coupling device be articulated in all directions, the pin 17 is removed, the part of the member 19 of reduced thickness located in the wider space between the limbs of the fork and a pin of smaller diameter than that of the pin 18 inserted in the registering holes. Thus is obtained, due to the play between the parts, a pivoted movement in a vertical direction.

It is evident that with the construction shown in Fig. 1 a fine adjustment of the height of the coupled implement or machine may be obtained and that with the construction shown in Figs. 2 and 3 an adjustment of the height of the coupled implement or machine may be obtained by locating the coupling elements 16 and 16' in different pairs of openings 12 and in addition that any desired character of coupling may be had between the tractor and machine or implement, from a coupling rigid in every direction to a coupling which is articulated for relative movement of the coupled devices in every direction.

It will be understood, of course, that the two constructions disclosed can be combined in such manner as to admit of the precise adjustment of the height of the coupled implement or machine and, at the same time, freedom of movement of the coupled implement or machine relative to the tractor.

Having now described my invention in certain of its embodiments, what I claim is:

1. In a coupling device of the class described, a coupling piece adapted to be rigidly attached to a tractor, a coupling element carried by said piece having a vertical socket, a coupling member mounted in said socket and having a portion adapted to be coupled to a connecting member on a machine or implement, a screw cooperating with said socket for adjusting said member vertically with respect to said coupling piece, and a hand-wheel for operating said screw.

2. In a coupling device of the class described, a coupling piece adapted to be rigidly attached to a tractor, a coupling carried by said piece and having a vertical socket, a coupling member mounted in said socket and having a horizontal socket at its lower end adapted to receive a connecting member on a machine or implement, and means cooperating with said vertical socket for adjusting said coupling member vertically with respect to said coupling piece.

3. In a coupling device of the class described, a coupling piece adapted to be rigidly attached to a tractor and having a vertical series of horizontal openings, a member adapted to be mounted in any of said openings and provided with a vertical socket, a coupling member mounted in said vertical socket and having a portion adapted to being coupled to a connecting member on a machine or implement, and means for adjusting said coupling member vertically with respect to said coupling piece.

Signed at Paris (France) this 25th day of August A. D. 1921.

LOUIS LUBIN DUBOIS.